(12) United States Patent
Funk et al.

(10) Patent No.: US 7,866,133 B2
(45) Date of Patent: *Jan. 11, 2011

(54) CROP PICKUP WITH TORSION BAR FLOTATION

(75) Inventors: Jeffrey S. Funk, Hillsboro, KS (US);
Michael J. Dresher, Wichita, KS (US);
Edward W. Esau, Hesston, KS (US);
Thomas G. Schrag, Hesston, KS (US)

(73) Assignee: AGCO Corporation, Duluth, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/416,839

(22) Filed: Apr. 1, 2009

(65) Prior Publication Data

US 2009/0183484 A1 Jul. 23, 2009

Related U.S. Application Data

(63) Continuation of application No. 11/620,394, filed on Jan. 5, 2007, now Pat. No. 7,555,885.

(51) Int. Cl.
*A01D 34/00* (2006.01)

(52) U.S. Cl. .................... 56/15.8; 56/14.9; 56/15.7

(58) Field of Classification Search ............. 56/14.3, 56/14.4, 15.8–16.3, 16.4 R, 17.3, 119, 219–226, 56/364, 10.2 E, 14.9, 208–210, 15.7
See application file for complete search history.

(56) References Cited

U.S. PATENT DOCUMENTS

| | | | | |
|---|---|---|---|---|
| 1,919,897 A * | 7/1933 | MacGregor et al. | ............ | 56/341 |
| 2,509,357 A | 5/1950 | Krause | | |
| 2,780,903 A * | 2/1957 | Kroll et al. | ............... | 56/209 |
| 2,796,717 A | 6/1957 | Orelind et al. | | |
| 3,293,835 A | 12/1966 | Gehman et al. | | |
| 3,574,990 A * | 4/1971 | Calder | ............ | 56/208 |
| 3,727,385 A * | 4/1973 | Twidale et al. | ............ | 56/208 |
| 3,771,302 A | 11/1973 | Vogt | | |
| 3,780,508 A * | 12/1973 | Tashiro | ............ | 56/208 |
| 3,962,849 A | 6/1976 | Stoessel et al. | | |
| 4,137,696 A | 2/1979 | Webb | | |
| 4,174,600 A | 11/1979 | Cicci et al. | | |
| 4,174,602 A | 11/1979 | Webb et al. | | |
| 4,237,680 A | 12/1980 | Hoch et al. | | |
| 4,446,685 A | 5/1984 | Coeffic | | |
| 4,519,188 A | 5/1985 | Webster et al. | | |
| 4,805,385 A | 2/1989 | Bohman et al. | | |
| 4,949,535 A | 8/1990 | Hurlburt | | |
| 4,961,303 A | 10/1990 | McCarty | | |
| 5,327,709 A * | 7/1994 | Webb | ............ | 56/15.8 |

(Continued)

OTHER PUBLICATIONS

International Preliminary Report on Patentability for PCT/US2007/086298 dated Jul. 16, 2009 (5 pgs).

*Primary Examiner*—Thomas B Will
*Assistant Examiner*—Joan D Misa
(74) *Attorney, Agent, or Firm*—Hovey Williams LLP

(57) ABSTRACT

The vertically swingable header of a farm machine utilizes a flotation mechanism having a torsion bar as the source of lifting force. The torsion bar is mounted on the header rather than the base machine and is operably coupled with the base machine through loading apparatus that includes a cam and cam follower system. An alternative embodiment utilizes a cam track fixedly mounted on the base machine.

6 Claims, 15 Drawing Sheets

U.S. PATENT DOCUMENTS

| | | |
|---|---|---|
| 5,463,856 A | 11/1995 | Beckwith |
| 5,535,578 A | 7/1996 | Honey |
| 6,904,741 B2 | 6/2005 | Priepke |
| 6,955,034 B1 | 10/2005 | Blakeslee et al. |

* cited by examiner

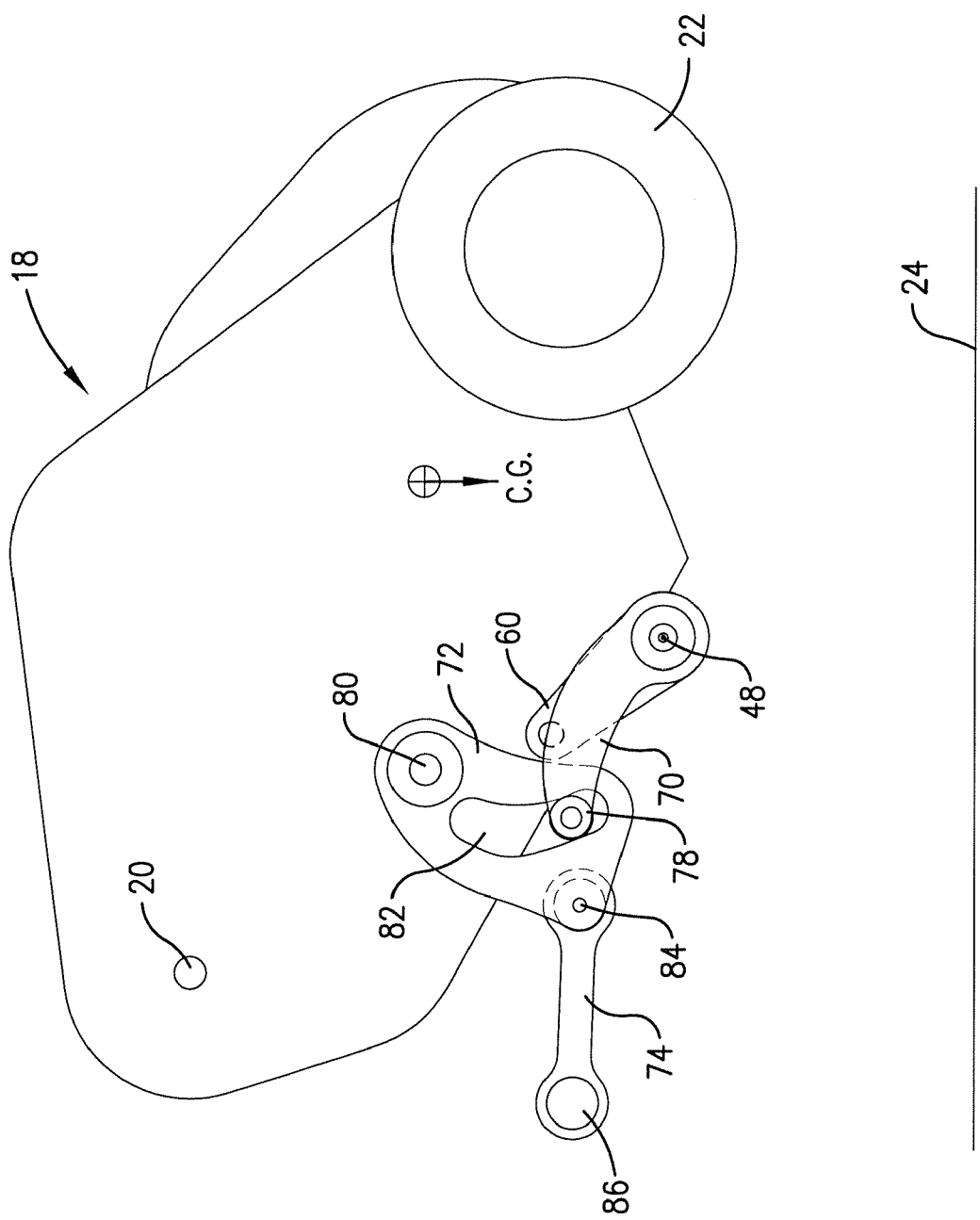

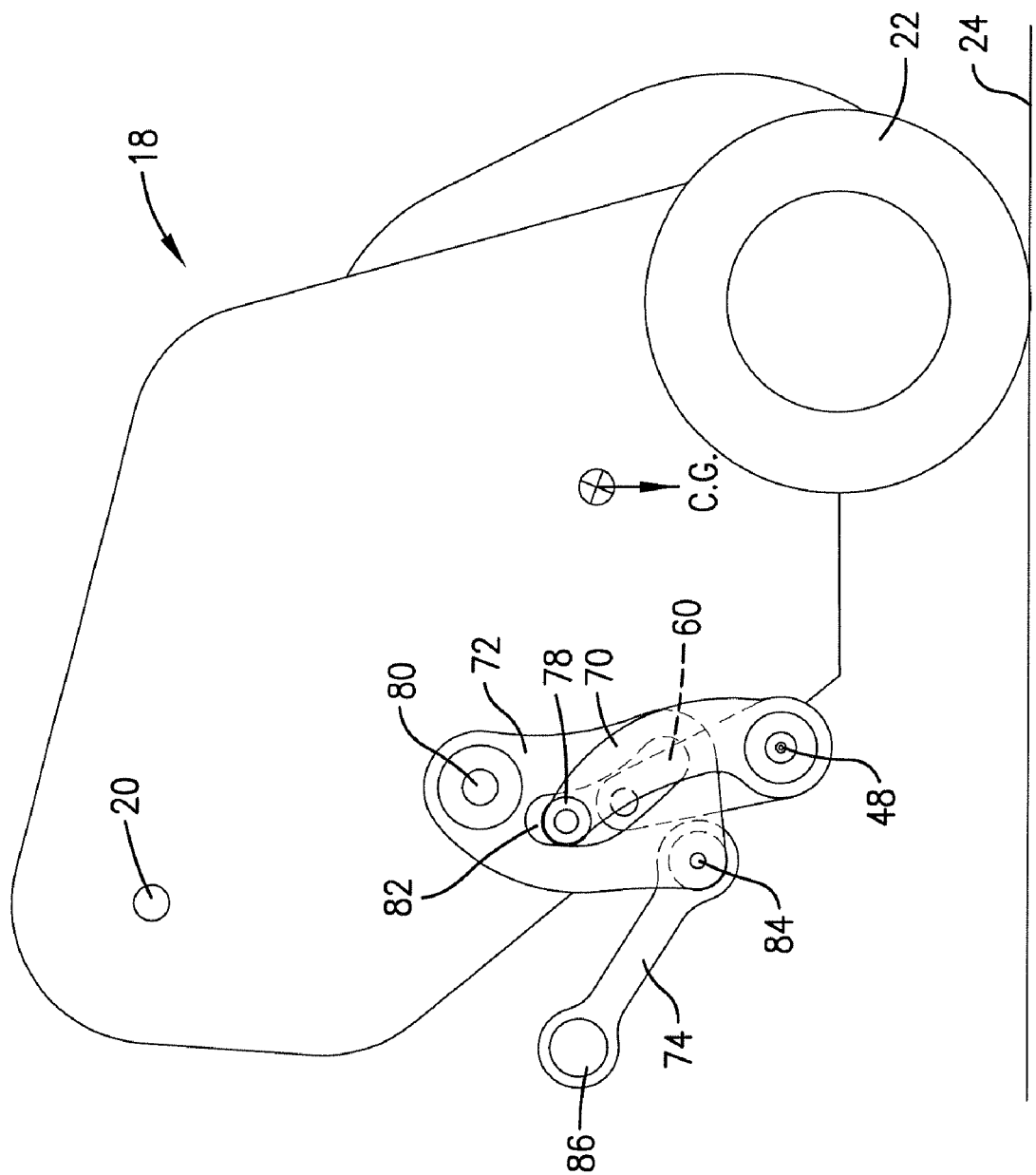

US 7,866,133 B2

CROP PICKUP WITH TORSION BAR FLOTATION

RELATED APPLICATIONS

This application is related to contemporaneously filed applications Ser. No. 11/620,458, filed Jan. 5, 2007 titled "Baler with Multi-Auger Pickup", now U.S. Pat. No. 7,448,196 and Ser. No. 11/620,469, filed Jan. 5, 2007 titled "Articulating Windguard for Agricultural Baler."

This application is a continuation of prior co-pending application Ser. No. 11/620,394, filed Jan. 5, 2007. Said prior application is hereby incorporated by reference in its entirety into the present specification.

TECHNICAL FIELD

The present invention relates to flotation mechanism for partially supporting the weight of a ground-engaging header of a farm machine such as, for example, the crop pickup of a round or square baler, so that the header is more responsive to changes in terrain as the machine moves along the ground than would otherwise be the case. In particular, it relates to a flotation mechanism that utilizes a torsion bar to provide the desired flotation force.

BRIEF DESCRIPTION OF THE DRAWINGS

FIGS. 8a, 8b, 8c, 8d and 8e are schematic illustrations of the pickup header and flotation mechanism illustrating the manner in which the flotation mechanism provides flotation force for the header at various vertical positions of the header;

DETAILED DESCRIPTION

Figure 1:
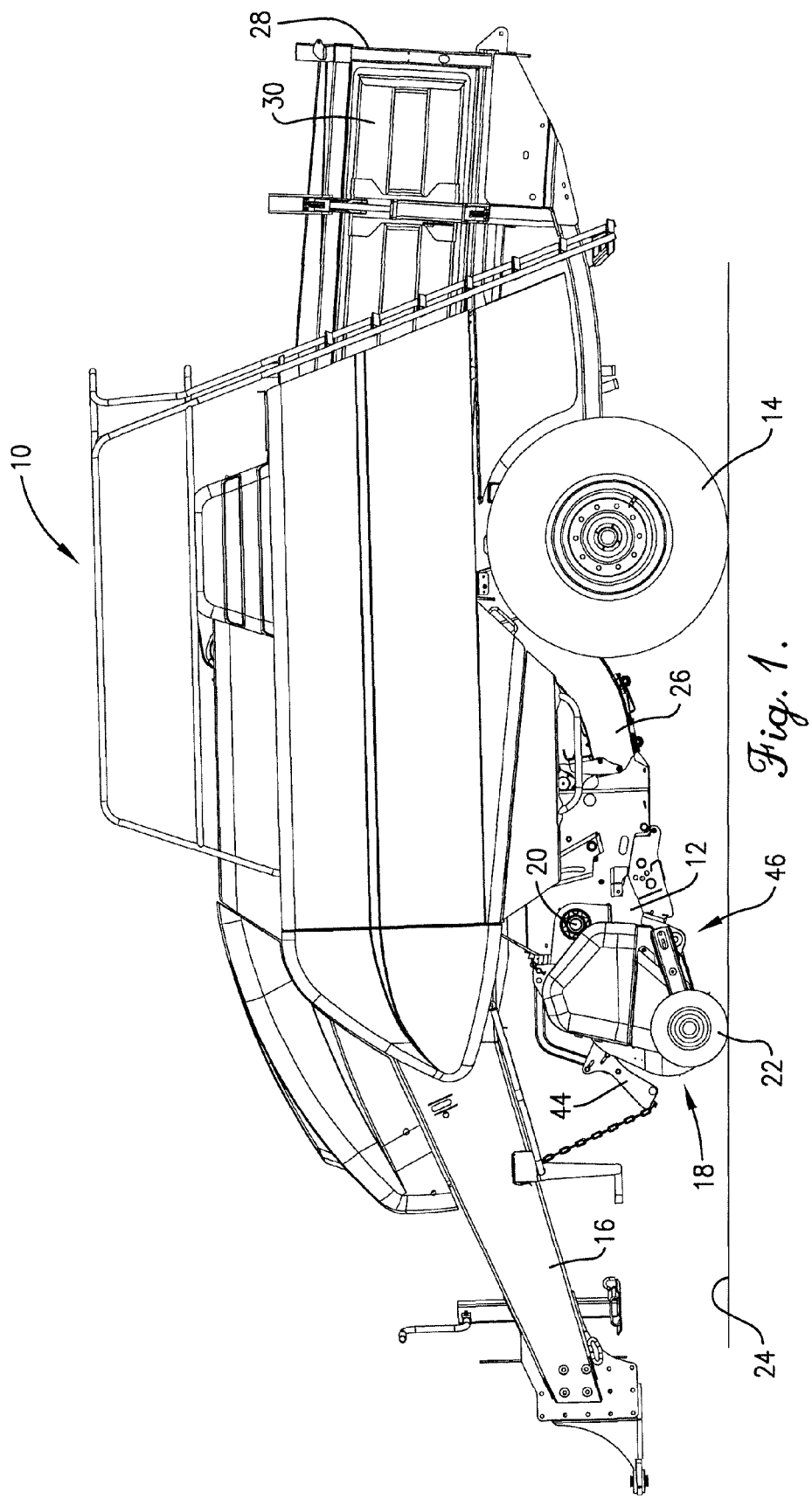
FIG. 1 is a side elevational view of one exemplary type of farm machine with which header flotation mechanism in accordance with the principles of the present invention may be utilized, the illustrated machine comprising a large rectangular baler.
Figure 2:
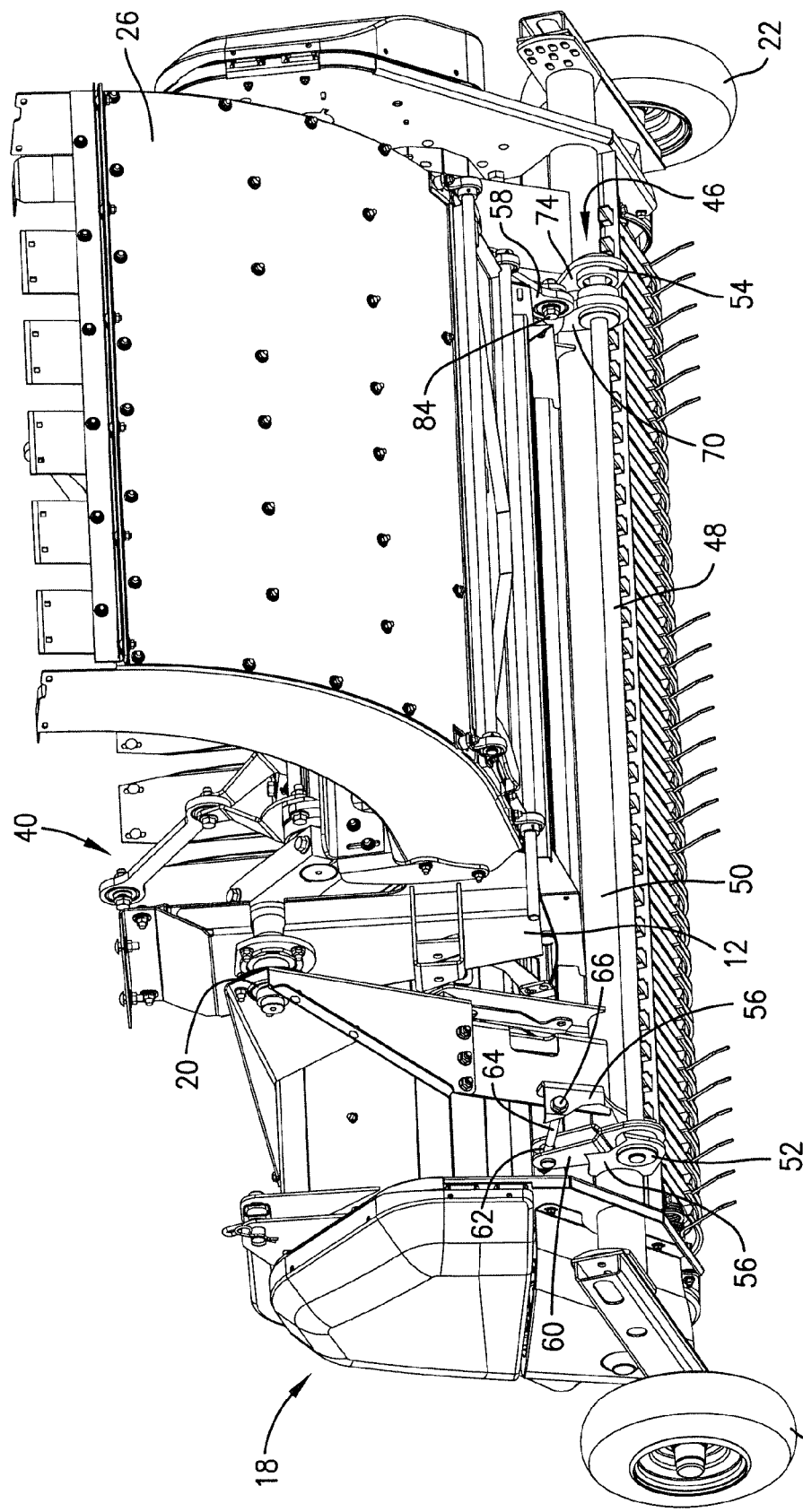
FIG. 2 is an enlarged, fragmentary, left rear isometric view of the back and underside of the pickup header of the machine.
Figure 3:
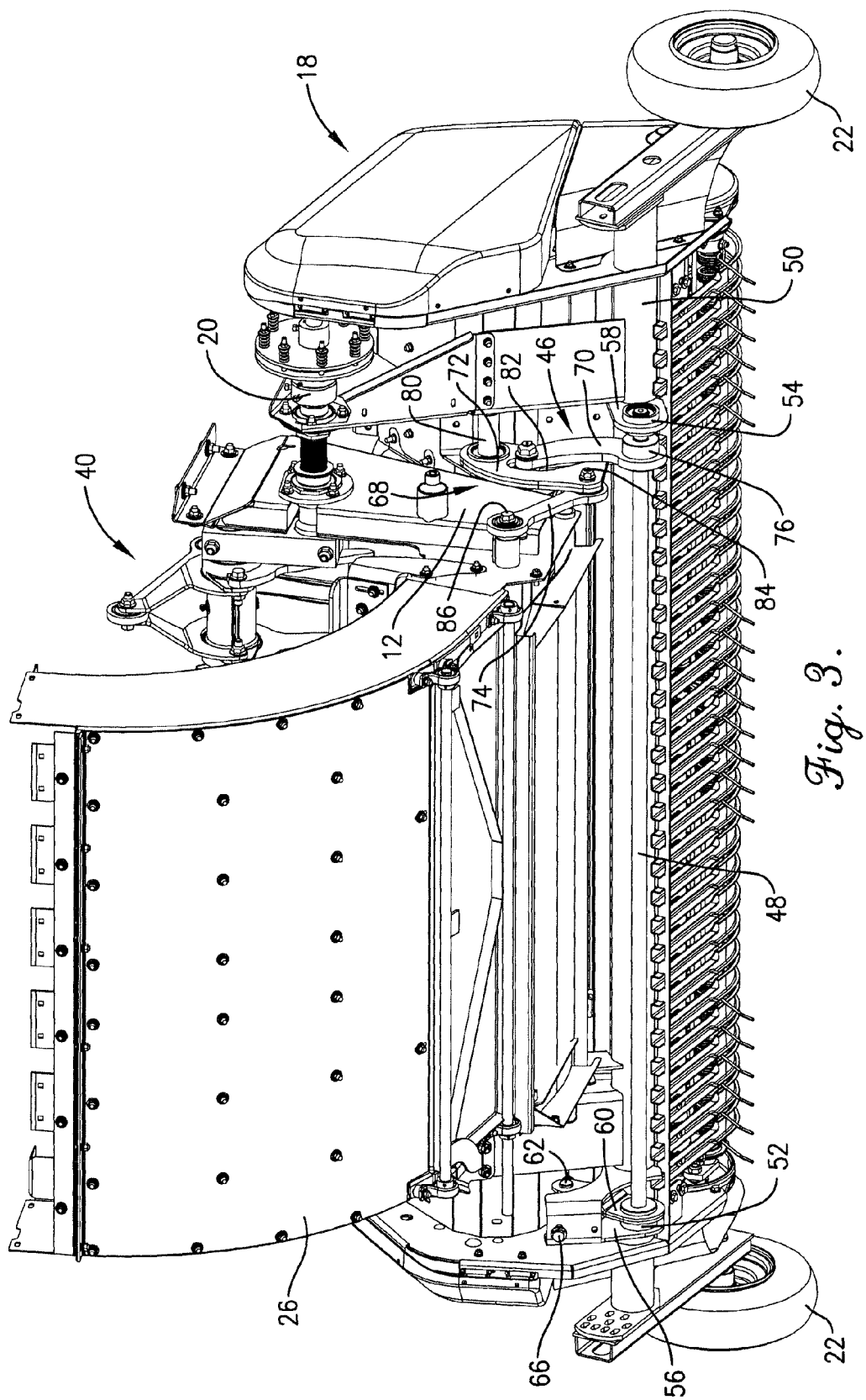
FIG. 3 is an enlarged, fragmentary, right rear isometric view of the back and underside of the pickup header.
Figure 4:
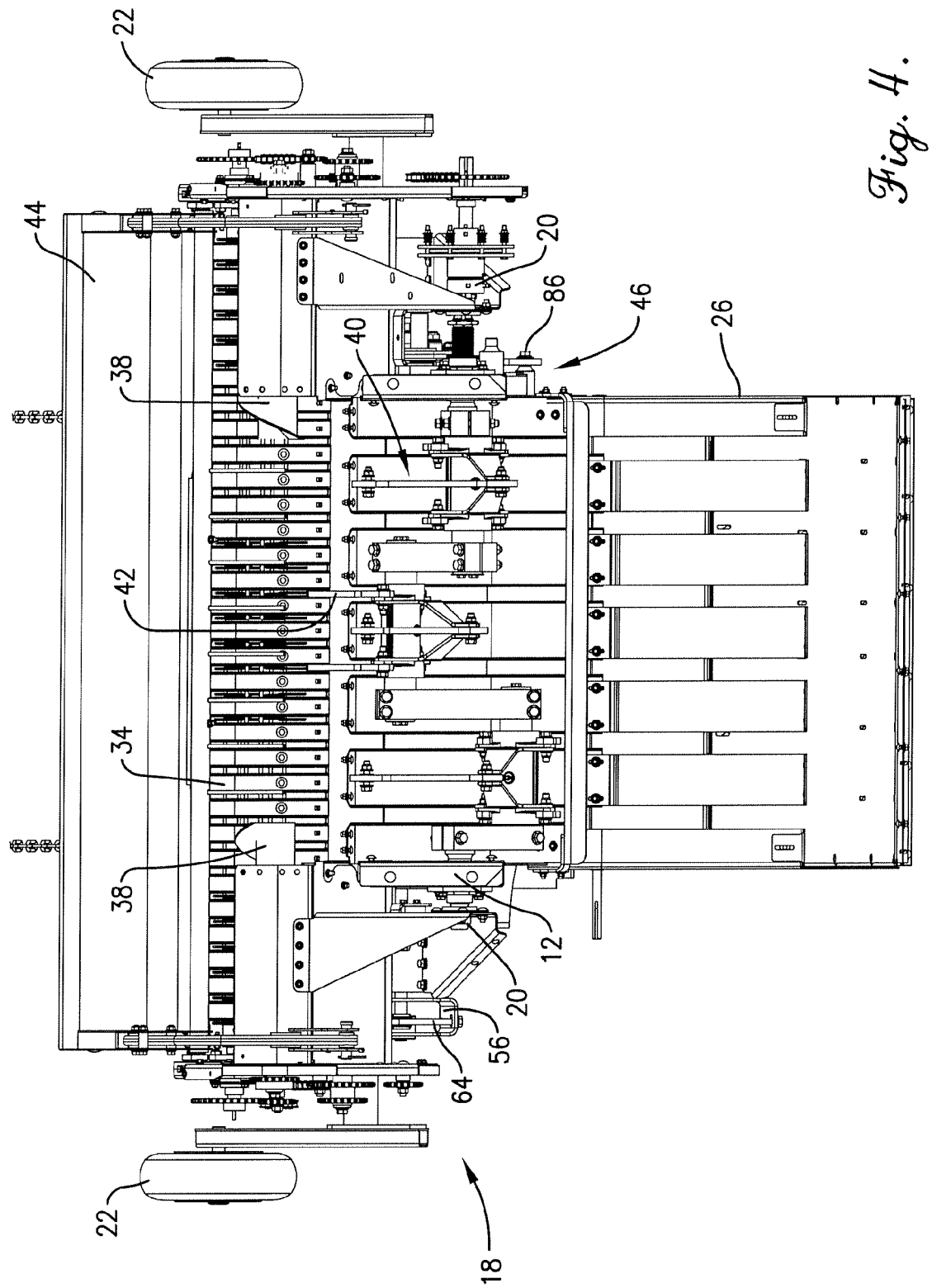
FIG. 4 is a fragmentary top plan view of the feeding duct and pickup header of the machine.
Figure 5:
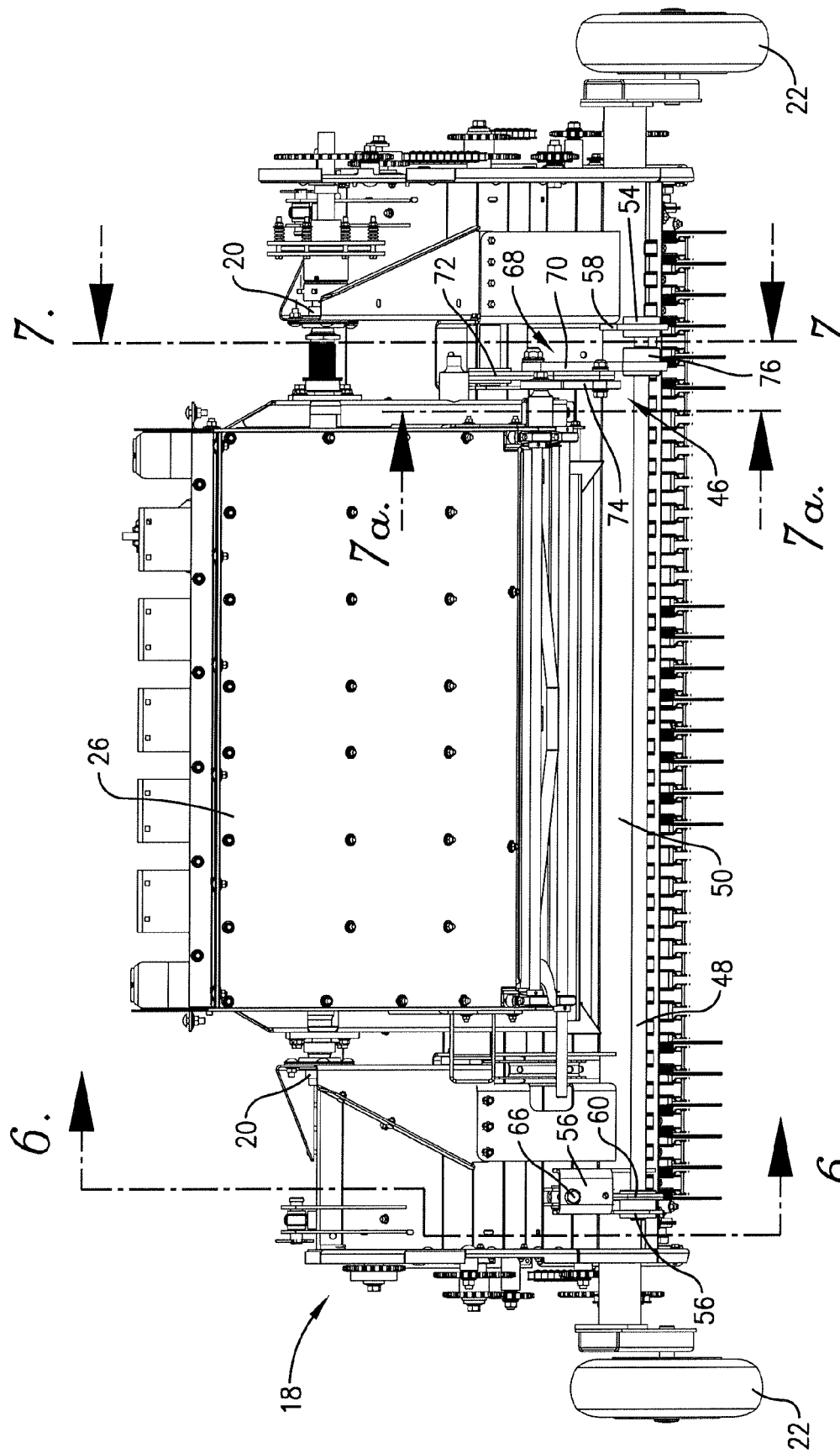
FIG. 5 is a rear elevational view of the feeding duct and pickup header.

The present invention is susceptible of embodiment in many different forms. While the drawings illustrate and the specification describes certain preferred embodiments of the invention, it is to be understood that such disclosure is by way of example only. There is no intent to limit the principles of the present invention to the particular disclosed embodiments.

In particular, while the present specification and drawings disclose flotation mechanism utilized with the pickup header of a large rectangular baler, the principles of the present invention are not limited to any particular type of farm machine, nor are they limited to any particular type of harvesting head or header. Thus, it is to be understood that a farm machine in the form of a baler, and a head or header in the form of a pickup, have been selected and disclosed for exemplary purposes only to facilitate an explanation of the principles of the present invention.

Baler 10 includes a chassis or frame broadly denoted by the numeral 12 which is supported for ground travel by wheels 14. A tongue 16 at the front of the machine is adapted to be coupled with a towing vehicle (not shown). A pickup header 18 is pivotally attached to frame 12 by a pair of pivots 20 on opposite sides of the machine and has a pair of gauge wheels 22 that ride along the ground 24 as the machine advances. Pickup header 18 is adapted to lift crop materials off the ground as the machine advances, and to deliver the picked up materials rearwardly into a duct 26 leading upwardly and rearwardly to an interior baling chamber (not shown). As is well understood by those skilled in the art, charges of crop material accumulating within duct 26 are intermittently stuffed up into the baling chamber between compaction strokes of an interior plunger (not shown) which compresses the material rearwardly toward an outlet 28 at the rear of the machine. Adjustable sidewalls 30 restrict the dimensions of the outlet 28 so as to provide back pressure for the plunger, which thereby compresses the charges of material into a compacted bale as the bales are also incrementally moved rearwardly into the machine during each compaction stroke of the plunger.

Pickup header 18 may be constructed in a variety of ways. In the illustrated embodiment, pickup header 18 includes a retracting finger pickup rotor 32 (FIG. 6) that rotates in a clockwise direction viewing that figure to lift materials off the ground and place them on top of a platform or shelf defined by the upper surface of a plurality of wrapper straps 34 that partially encircle rotor 32. In the illustrated embodiment, a pair of lower stub augers 36 are disposed on opposite lateral sides of a centrally disposed inlet (not shown) to duct 26 for gathering materials picked up by rotor 32 toward the center of the machine and then introducing them into such inlet. A pair of upper stub augers 38 are spaced above lower stub augers 36 on opposite sides of the inlet to duct 26 and cooperate with lower stub augers 36 in center-gathering the crop materials and in controlling the flow thereof as they enter duct 26.

Figure 6:
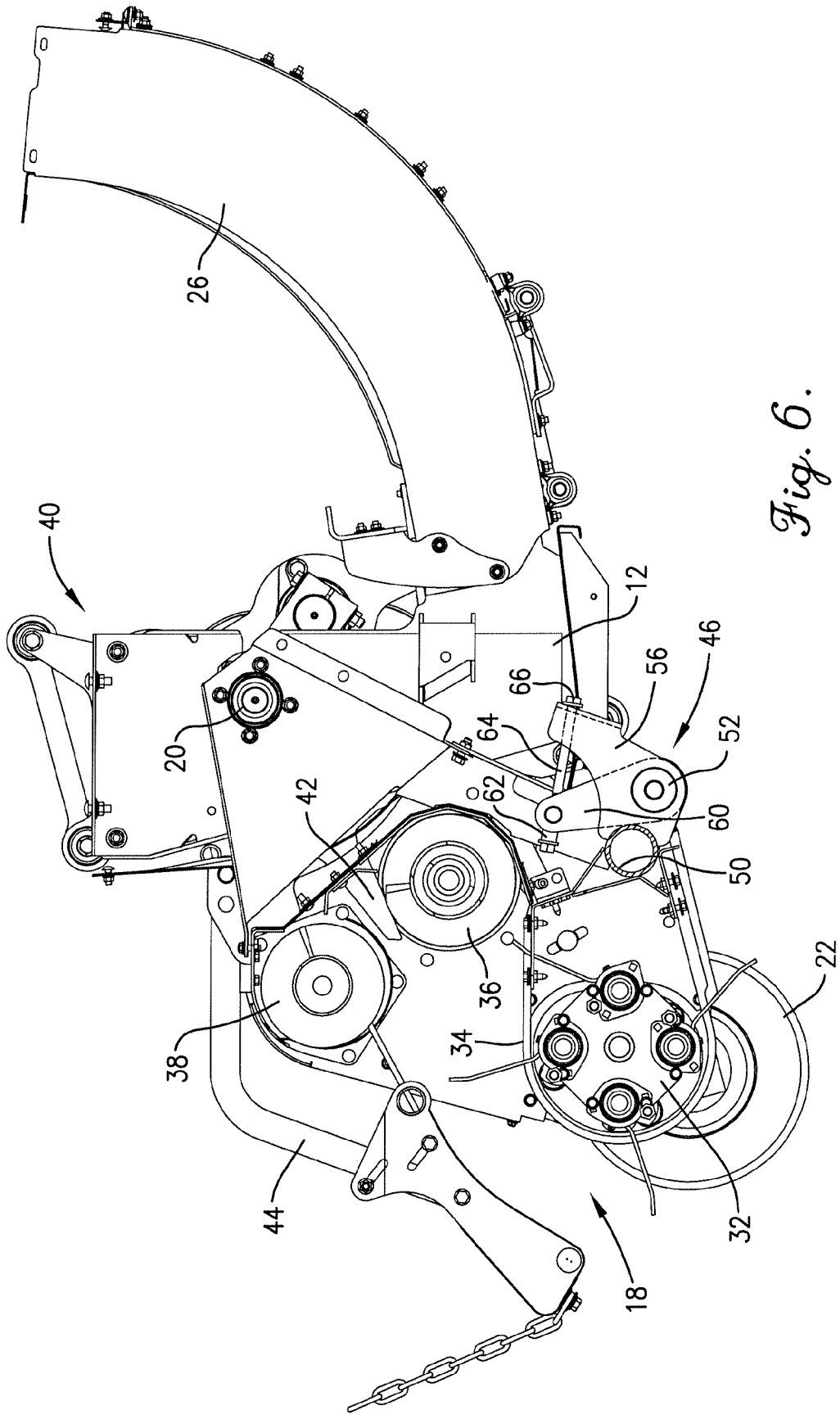
FIG. 6 is a vertical cross-sectional view through the feeding duct and pickup header taken substantially along line 6-6 of FIG. 5.
Figure 7:
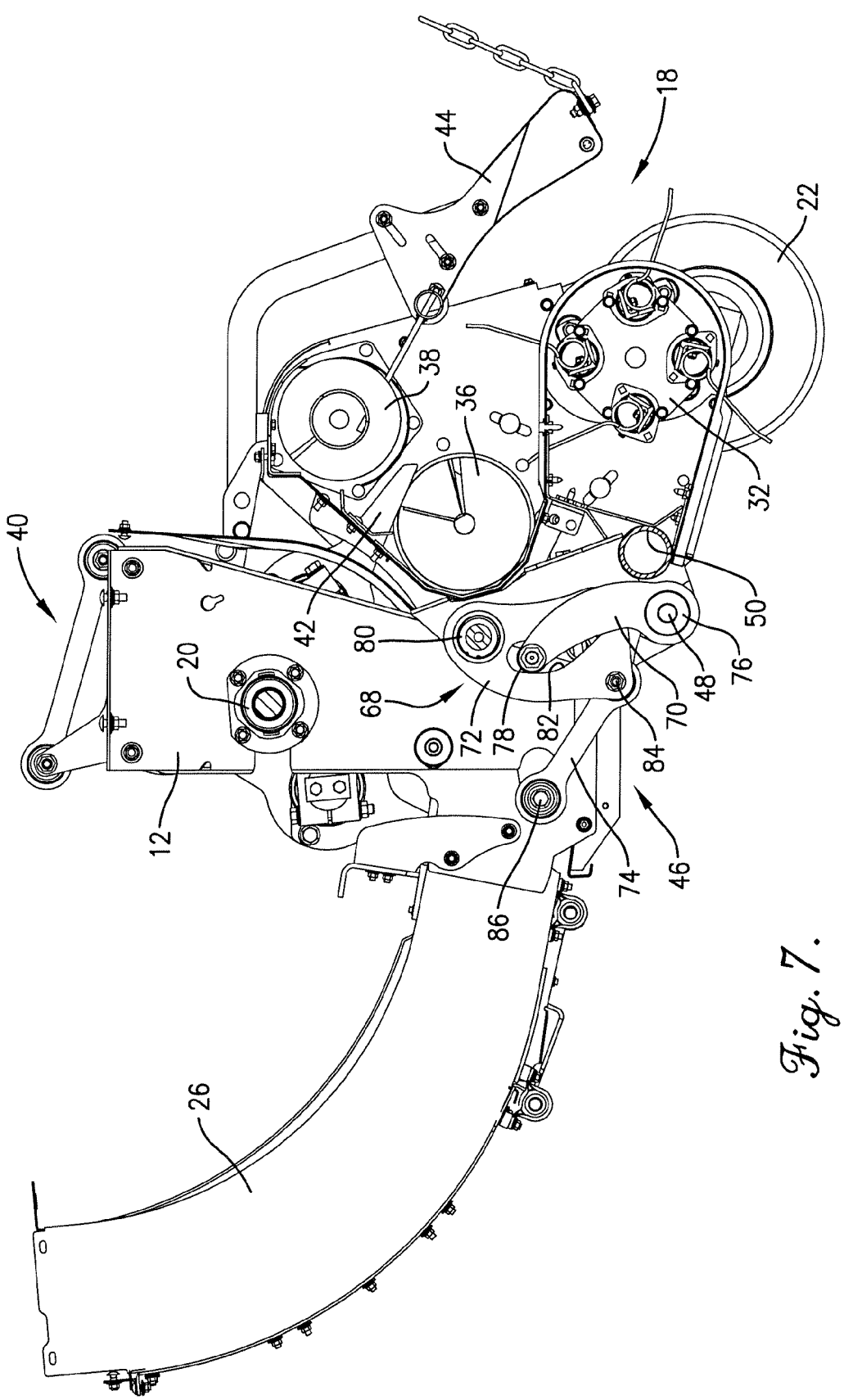
FIG. 7 is a vertical cross-sectional view through the feeding duct and pickup header taken substantially along line 7-7 of FIG. 5.
Figure 7A:
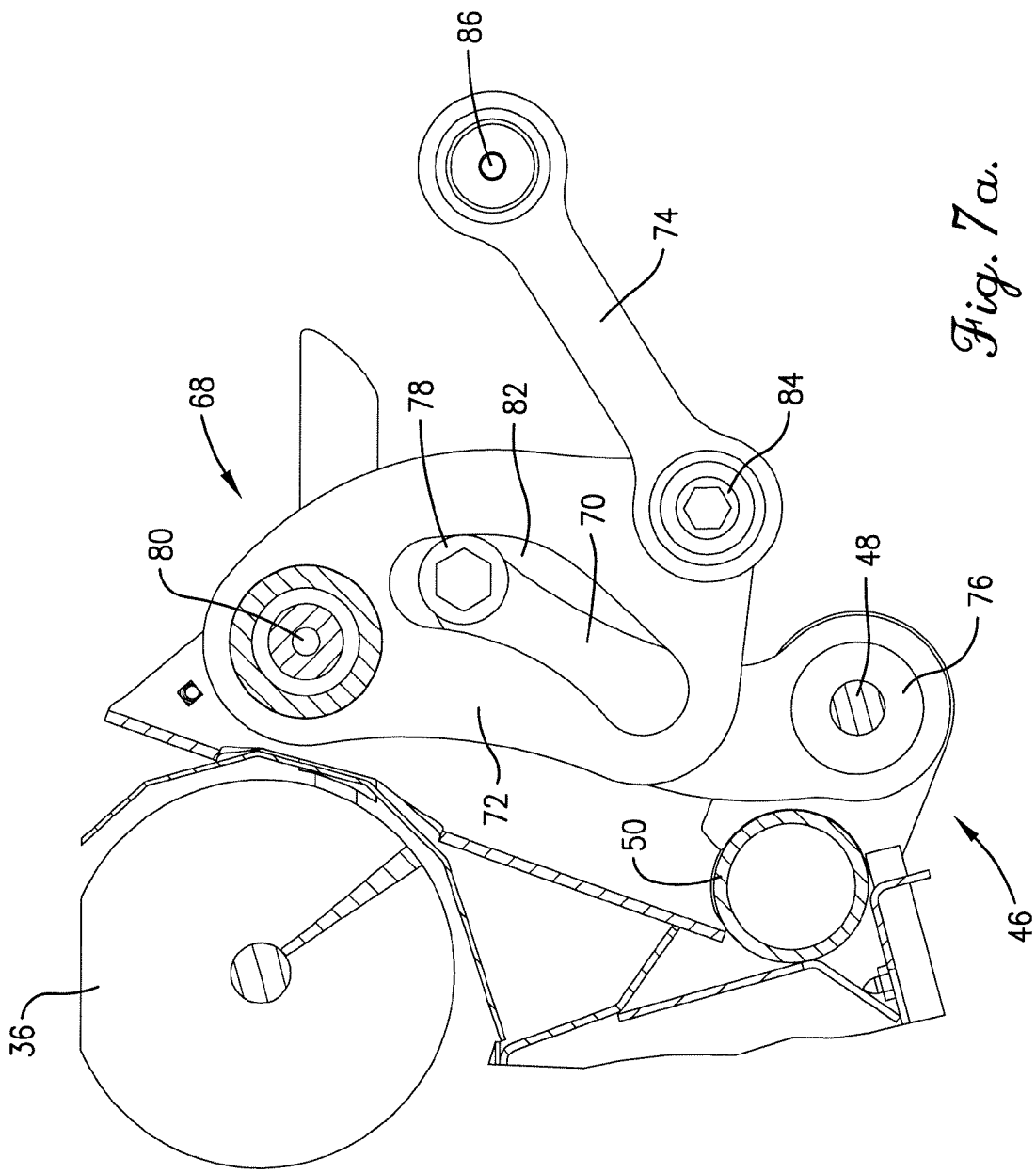
FIG. 7a is an enlarged, fragmentary cross-sectional view through the flotation mechanism taken substantially along line 7a-7a of FIG. 5.

Preferably, lower stub augers 36 are rotating clockwise viewing FIG. 6 such that front peripheral portions thereof are rotating upwardly and rearwardly, while, preferably, upper stub augers 38 are rotating counterclockwise viewing FIG. 6 such that front portions thereof rotate downwardly and rearwardly. Feeding apparatus in the nature of a packer mechanism 40 is disposed adjacent the inlet to duct 26 and includes a plurality of forks 42 that intermittently sweep downwardly and rearwardly through the region in front of the inlet to duct 26 and between the left and right stub augers 38, 40 to engage incoming crop materials and feed the same rearwardly into duct 26. Further details of construction and operation of stub augers 36, 38 and packing forks 42 are described in the contemporaneously filed application titled "Baler with Multi-Auger Pickup" as noted above.

A windguard 44 is attached to pickup header 18 in front of stub augers 36, 38 and above lifting rotor 32 for the purpose of confining and controlling the inflow of crop materials ahead of the stub augers 36, 38. Details of construction and operation of windguard 44 are set forth in contemporaneously filed application titled "Articulating Windguard for Agricultural Baler" as noted above.

The weight of header 18 is born partially by flotation mechanism broadly denoted by the numeral 46 so as to lighten the down force exerted by gauge wheels 22 against the ground as the machine is advanced. A primary component of flotation mechanism 46 is a long, transversely cylindrical torsion bar 48 that, in a preferred embodiment, is mounted on header 18 for up and down movement therewith as header 18 moves about pivots 20 during changes in the terrain. Torsion bar 48 could also be mounted on frame 12 instead of header 18, but there are significant benefits to having it carried by header 18.

In the preferred embodiment torsion bar 48 extends horizontally across the rear of header 18 in parallel relationship with a structural frame tube 50 of header 18. Opposite ends of torsion bar 48 are rotatably supported by bearings 52 and 54 respectively in a pair of brackets 56 and 58 projecting rearwardly from and fixed to structural tube 50 generally adjacent opposite ends thereof.

The left end of torsion bar 48 has a yoke-shaped lever 60 rigidly affixed thereto and projecting generally upwardly and forwardly therefrom. At the upper, forward end of lever 60, a trunnion 62 swively supports an adjustment bolt 64 that interconnects the upper end of lever 60 with the rearwardly disposed portion of bracket 56. The head 66 of adjustment bolt 64 maybe adjustably rotated so as to increase or decrease the space between the upper end of lever 60 and bracket 56, thereby effectively adjusting the stationary anchor point of the left end of torsion bar 48 to adjust the amount of preloaded torsion or "wrap" in bar 48 as will hereinafter be explained in more detail.

In order to wrap up or load torsion bar 48, flotation mechanism 46 further includes loading apparatus broadly denoted by the numeral 68 and located generally at the right end of torsion bar 48. Loading apparatus 68 operably interconnects torsion bar 48 and frame 12 of baler 10 in a manner to twist torsion bar 48 and use the output force to provide flotation for header 18. Loading apparatus 68 includes three major components, namely, a crank arm 70 fixed to torsion bar 48, a cam 72 swingably mounted on header 18 for movement therewith, and a link 74 pivotally connected between frame 12 of the machine and cam 72. Thus, crank arm 70 and cam 72 are mounted on header 18 and move up and down with it, while the rear end of link 74 is mounted on baler frame 12 and moves up and down with that structure.

The radially inner end of crank arm 70 is fixed to the right end of torsion bar 48 via a hub 76. On the other hand, the radially outer end of crank arm 70 carries a cam follower 78 in the nature of a free-wheeling roller. Cam 72 comprises a generally upright plate that is swingably attached at its upper end to header 18 by a pivot 80 for fore-and-aft swinging movement in a plane that is perpendicular to the longitudinal axis of torsion bar 48. A generally boomerang-shaped slot 82 is defined within cam 72 and receives follower 78 of crank arm 70. During operation, follower 78 rides along the rear extremity of cam slot 82 as hereinafter described. At its lower end, cam 72 has a pivotal connection 84 with the front end of link 74. At its rear end, link 74 is attached to frame 12 of baler 10 by a pivot 86.

Operation

Figure 8B:
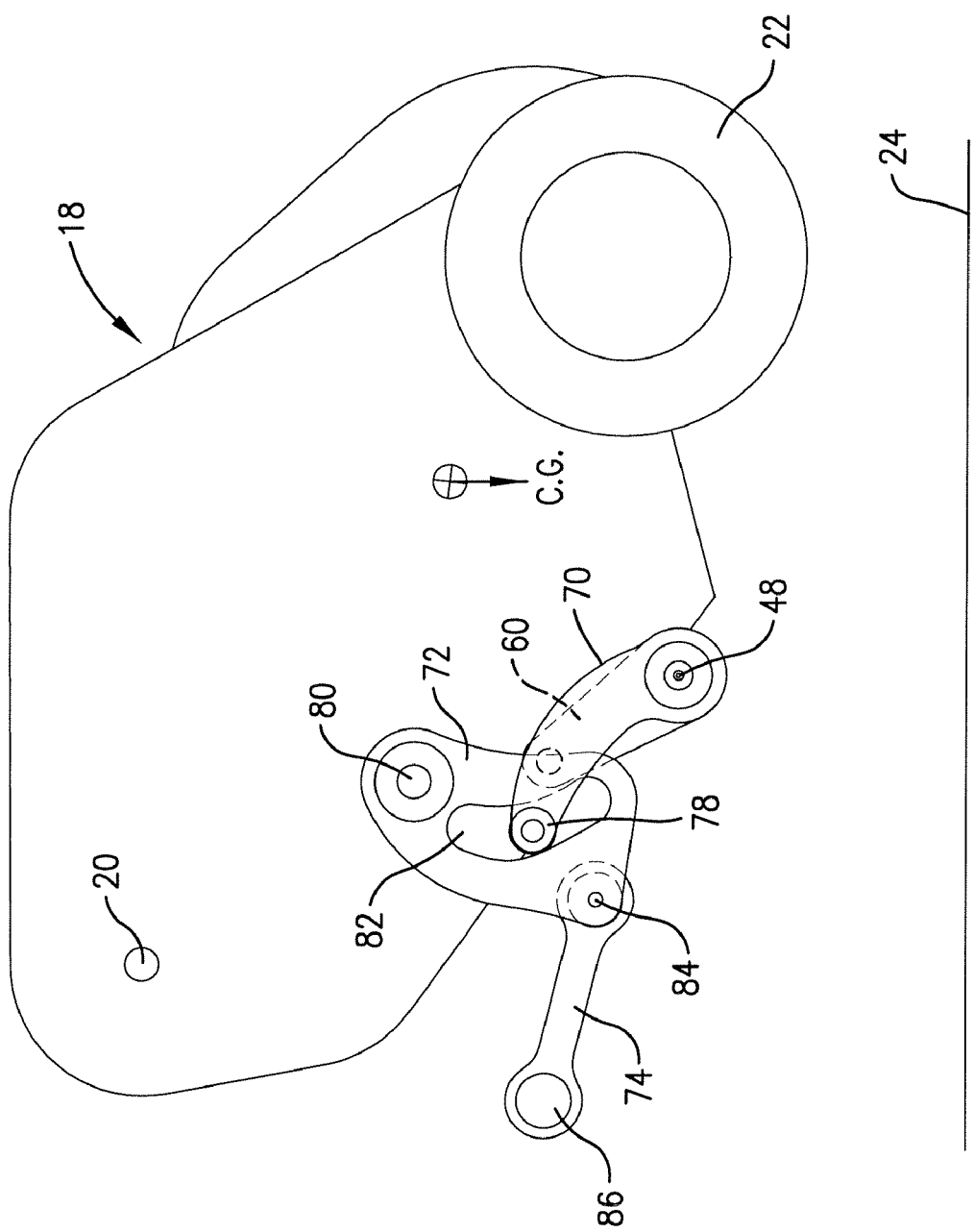

The operation of flotation mechanism 46 may best be understood by reference initially to FIGS. 8*a*-8*e* and 9. FIG. 8*a* illustrates header 18 in a fully raised position relative to the rest of the baler 10. Although gauge wheels 22 in FIG. 8*a* are illustrated as being spaced substantially above ground line 24, in actual field operations gauge wheels 22 almost always remain in contact with the ground. Flotation mechanism 46 only lightens the load of header 18; it never completely offsets the load of header 18 or raises it off the ground. In some situations it may be desirable to operate header 18 slightly off the ground, resting on suitable stops (not shown) as well understood by those skilled in the art. One or more hydraulic cylinders (not shown) may also be employed to lift header 18 off the ground and, in some cases, to support the header in lieu of mechanical stops. For the most part, however, as noted above, header 18 is operated with gauge wheels 22 contacting the ground, and the following description will assume that particular operating condition for the sake of simplifying an explanation of the operation of flotation mechanism 46.

Thus, in FIGS. 8*a*-8*e*, ground line 24 actually comprises the ground level at the baler wheels 14, rather than directly under gauge wheels 22. For header 18 to be fully raised relative to the rest of the baler as shown in FIG. 8*a*, header 18 would have to be intentionally lifted up by suitable hoisting means when the baler is stationary (or lifted by the hydraulic cylinder(s) mentioned above), or the header would have to experience a sharp rise in the terrain not yet encountered by baler wheels 14 when the baler is in motion.

Figure 8C:
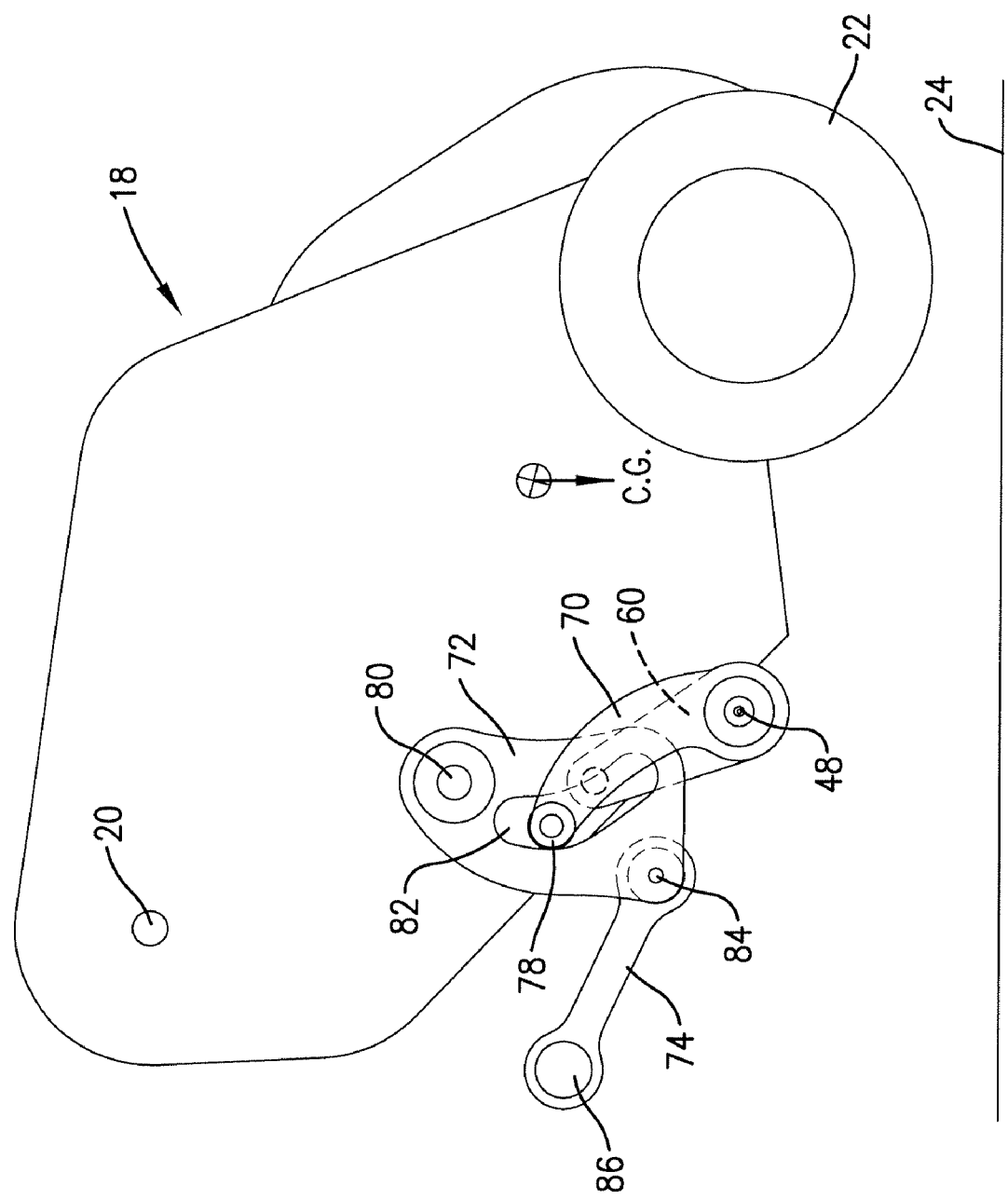

It is desirable to have torsion bar 48 preloaded a certain amount when header 18 is in its fully raised position of FIG. 8*a*. In other words, in the condition of FIG. 8*a*, stationary lever 60 at the left end of torsion bar 48 has been adjustably rotated a certain amount in a counterclockwise direction relative to the right end of bar 48 and crank arm 70 to create a counterclockwise restoring force in crank arm 70. In the chart of FIG. 9, this condition corresponds to point A, wherein gauge wheels 22 may be 11 inches above the level of ground wheels 14, for example, and the equivalent lift force at gauge wheels 22 from flotation mechanism 46 is on the order of slightly less than 400 pounds, for example. Although the deflection at point A is indicated on the chart as being 0° at this time, the actual defection of torsion bar 48 from an unstressed condition is of course significantly more than 0° at this time. However, that value serves as a reference point in the chart of FIG. 9 for quantifying the amount of wrap up that occurs at other positions of header 18 in FIGS. 8*b*-8*e*.

The counterclockwise restoring force exerted by crank arm 70 causes follower 78 to bear against the back edge of cam slot 82 generally near the bottom of slot 82. Thus, crank arm 70 seeks to rotate cam 72 in a clockwise direction, which rotation is resisted by baler link 74 because it is anchored to baler frame 12 at pivot 86. Baler link 74 thus provides the lifting force against header 18 that corresponds to the equivalent lift force values at gauge wheels 22 set forth in the chart of FIG. 9.

When header 18 is lowered from the fully raised position of FIG. 8*a*, it rotates clockwise about pivots 20, carrying all parts of flotation mechanism 46 with it except for baler link 74. As the rear pivot point 86 of link 74 is in a fixed position relative to moving header 18, link 74 pushes cam 72 forwardly, i.e., counterclockwise about pivot 80. This, in turn, causes follower 78 to ride upwardly in slot 82, forcing a clockwise movement of crank arm 70 and consequential deflection (wrap up) of torsion bar 48. Thus, by the time header 18 reaches the position illustrated in FIG. 8*b* (corresponding to point B on the chart of FIG. 9), torsion bar 48 will have wrapped up an additional 9° while the header 18 is, for example, approximately seven inches above the ground line 24 at the baler wheels 14.

During further lowering of header 18, link 74 continues to push cam 72 in a counterclockwise direction about pivot 80, causing follower 78 to ride up further in slot 82 and rotate crank arm 70 clockwise, thus further increasing the wrap up of torsion bar 48. The position of header 18 in FIG. 8c corresponds with point C on the chart of FIG. 9. This movement from point B to C has resulted in lowering the pickup height to approximate three inches above the level of the baler ground wheels 14 and has significantly increased the deflection of torsion bar 48. It will be noted in this respect from the graph of FIG. 9 that the lift force at the gauge wheels 22 has increased from approximately 400 pounds to approximately 650 pounds during this interval.

One exemplary typical operating range for flotation mechanism 46 is between points C and D on the graph of FIG. 9 wherein the gauge wheels 22 are between three inches above the level of baler wheels 14 and at the same level as baler wheels 14. This corresponds to a value of three inches at point C and zero inches at point D on the graph of FIG. 9. It will be noted that within this operating range, the lift force at gauge wheels 22 is relatively flat, increasing only about 50 pounds from 650 pounds at three inches to almost 700 pounds at zero inches. This is due to the geometry of the interacting components of the flotation mechanism 46 and the fact that both the torsion bar 48 and cam 72 are carried by header 18 while link 74 is mounted on the baler frame 12. The condition of things in FIG. 8d corresponds to point D on the graph of FIG. 9.

Figure 8E:
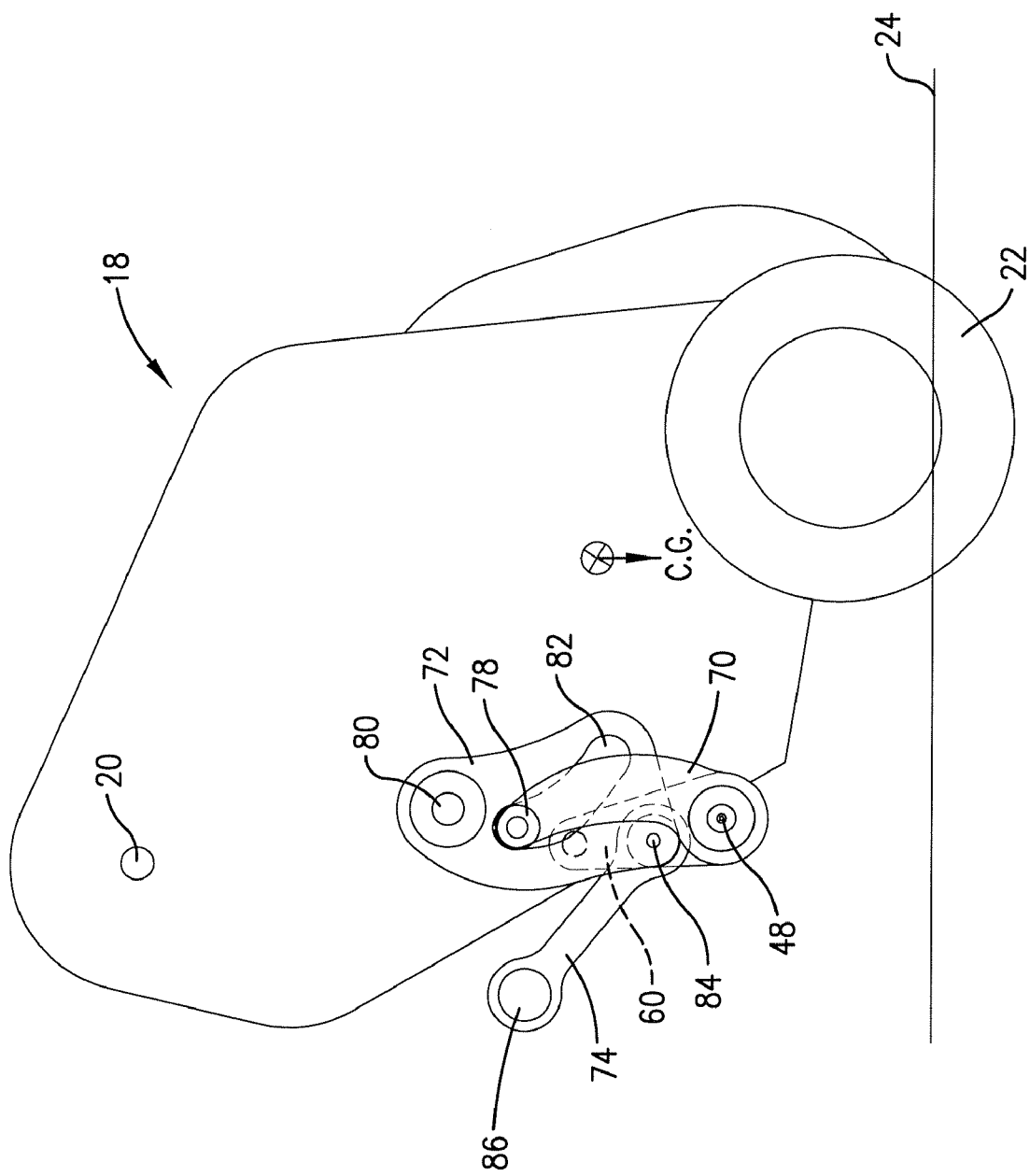
Figure 9:
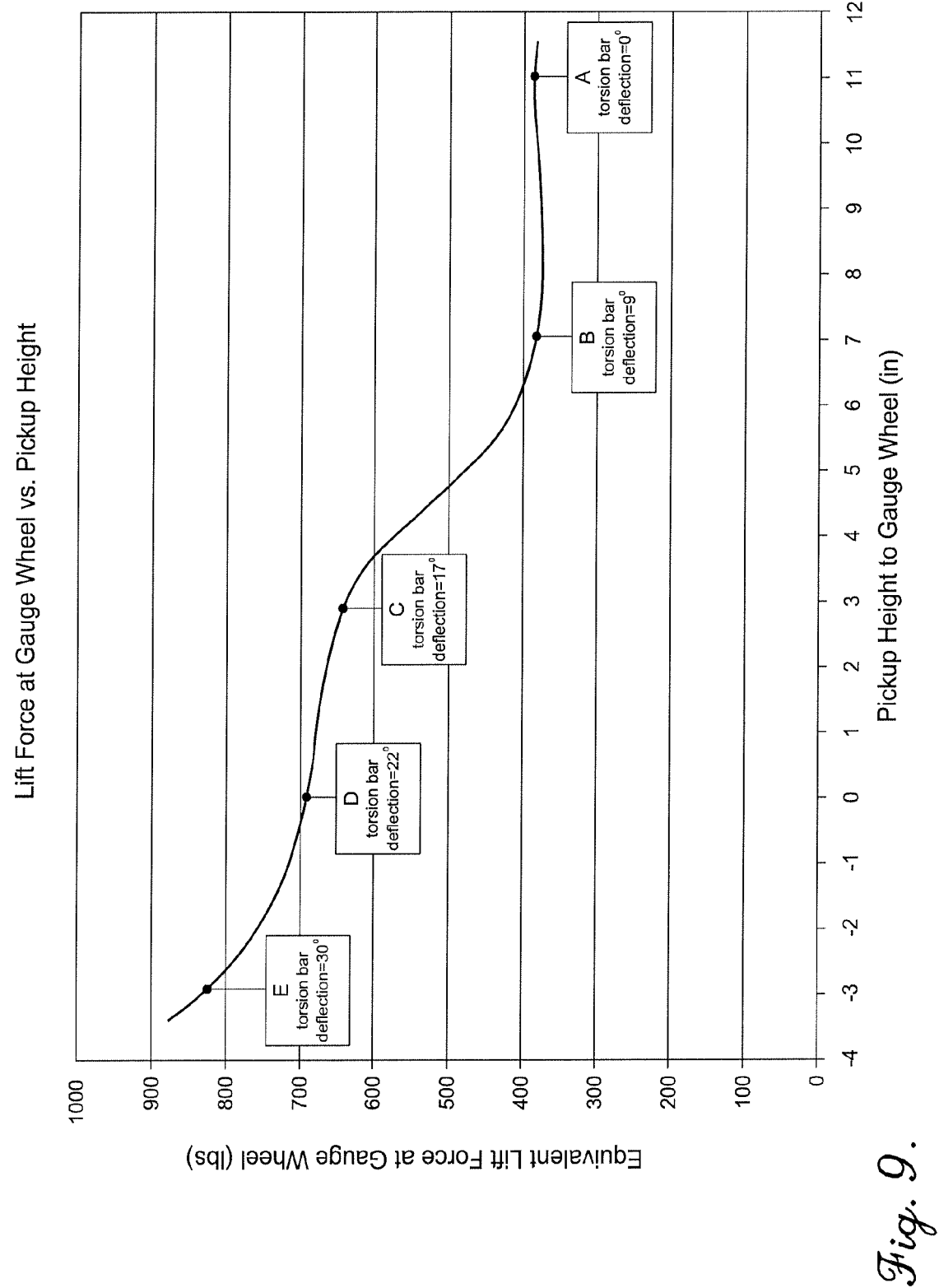
FIG. 9 is a chart illustrating the relationship between the vertical position of the header and the lift force provided by the flotation mechanism.

FIG. 8e illustrates the condition of things when header 18 drops below the ground line at baler wheels 14 to a lower limit of travel approximately three inches below such level. This corresponds to point E on the graph of FIG. 9. It will be seen that between points D and E, the additional three-inch drop results in a significant increase in lifting force at gauge wheels 22 as a result of some additional 8° of wrap up of the torsion bar 48. During this interval, the lifting force at gauge wheels 22 has increased from slightly below 700 pounds to approximately 825 pounds.

Generally speaking, as torsion bar 48 is deflected, it generates a force on cam 72. The result is two reactions on cam 72. The reaction at link 74 acts to push header 18 upwardly or "float" it. The counter-reaction on pivot 80 of cam 72 acts to pull header 18 downwardly. Additionally, there is a reaction generated where torsion bar 48 mounts to the header frame. This reaction is an equal and opposite force to that between cam follower 78 and cam 72. As header 18 rotates downwardly, cam 72 continues to deflect torsion bar 48, generating an output force in link 74. This output force and its corresponding lever arm generate a moment counter to that of the weight of header 18.

Thus, as baler 10 travels along level ground as illustrated in FIG. 8d with header gauge wheels 22 and baler wheels 14 at the same height, flotation mechanism 46 exerts a lifting force against header 18 that significantly lightens header 18. If gauge wheels 22 encounter a rise in the terrain relative to baler wheels 14 (as illustrated in FIG. 8c), the ground rotates header 18 upwardly about its pivots 20 in a counterclockwise direction, which causes cam 72 to rotate slightly clockwise about its pivot 80, allowing follower 78 to drop slightly in cam slot 82. Such slight drop of follower 78 allows the restoring force in torsion bar 48 to rotate crank arm 70 slightly in a counterclockwise direction, thereby slightly unwinding torsion bar 48 and slightly decreasing the lifting force exerted by baler link 74. More significant rises in the terrain encountered by gauge wheels 22 relative to baler wheels 14 allow torsion bar 48 to unwind even further, as illustrated in FIG. 8b for example, as cam 72 rotates further clockwise and follower 78 drops further in cam slot 82.

If gauge wheels 22 encounter a drop in the terrain relative to baler wheels 14 from the level condition of FIG. 8d, header 18 pivots clockwise about its pivots 20 so that cam pivot 80 is moved closer to baler link anchor point 86. This has the effect of causing baler link 74 to rotate cam 72 counterclockwise to the position shown in FIG. 8e, for example, moving follower 78 further up into cam slot 82 and rotating crank arm 70 clockwise relative to stationary lever 60. This further wraps up torsion bar 48 and increases the lifting force exerted by baler link 74 on header 18, until such time as the terrain drop is passed and baler wheels 14 and gauge wheels 22 are once again at the same level.

Utilizing a torsion bar to provide the lifting force in a flotation system has a number of significant advantages. For one thing, the mechanism is fairly simple and reliable, with fewer components than conventional coil spring-type flotation systems. For another, the torsion bar is less susceptible to collecting trash and residue than conventional coil spring systems, which sometimes have a tendency to pinch and trap materials between coils of the springs and other hardware of the system.

Locating the torsion bar on the header rather than the main frame of the machine provides further significant advantages. For example, in some product lines the same header may be used with a variety of different base machines, which may have different configurations and dimensions in areas where the header would normally attach. Therefore, in conventional products where much of the flotation mechanism is on the base machine, each different base machine may require its own custom flotation system to accommodate the unique conditions existing with respect to that particular base machine. This creates design issues and increases costs in a number of respects. By mounting the torsion bar on the header and simply connecting it in a suitable force-transmitting way to the base machine, the flotation mechanism can remain a single standard design for virtually all different models of base machines.

Having the torsion bar on the header also helps with dimensional and space issues. In this respect it is generally helpful to provide a long torsion bar rather than a short one to obtain the desired output from the torsion bar during operation. Inasmuch as the header is usually wider than the base machine, mounting the torsion bar on the header and orienting its longitudinal axis across the width of the header enables a longer torsion bar to be used than would be the case if the torsion bar were mounted on the base machine. Moreover on the header, the torsion bar can be tucked up under the header in a position where it is less likely to collect trash and residue than on the base machine, where more loose and air-borne materials are prevalent.

The special loading apparatus 68 with its cam 72 and crank arm 70 is helpful in providing flotation force over a full vertical operating range of the header without excessively wrapping up torsion bar 48. By allowing follower 78 of crank arm 70 to move in cam slot 82 during up and down motion of header 18, a portion of the header travel that would otherwise result in wrapping or unwrapping of the torsion bar 48 is devoted instead to movement of the cam follower 78 within cam slot 82. Thus, the deflection of torsion bar 48 over the full range of operating travel of header 18 is less than it would be if baler link 74 were connected directly to the radially outer end of crank arm 70, for example. Furthermore, by coordinating the shape of cam slot 82 with the various geometric relationships involved in flotation mechanism 46 and header 18, the shape of the lifting force curve as illustrated in the chart of FIG. 9 can be designed to most advantageously meet the flotation needs at hand. For example, while the embodiment illustrated in FIG. 9 shows a fairly flat curve between points C and D such that the lifting force through that range of header height is fairly constant, it may be desired to have a differently shaped curve over the operating range. This can be obtained by changing the shape of the cam slot 82, while also taking into consideration the other geometric relationships involved.

Alternative Embodiment

Figure 10:
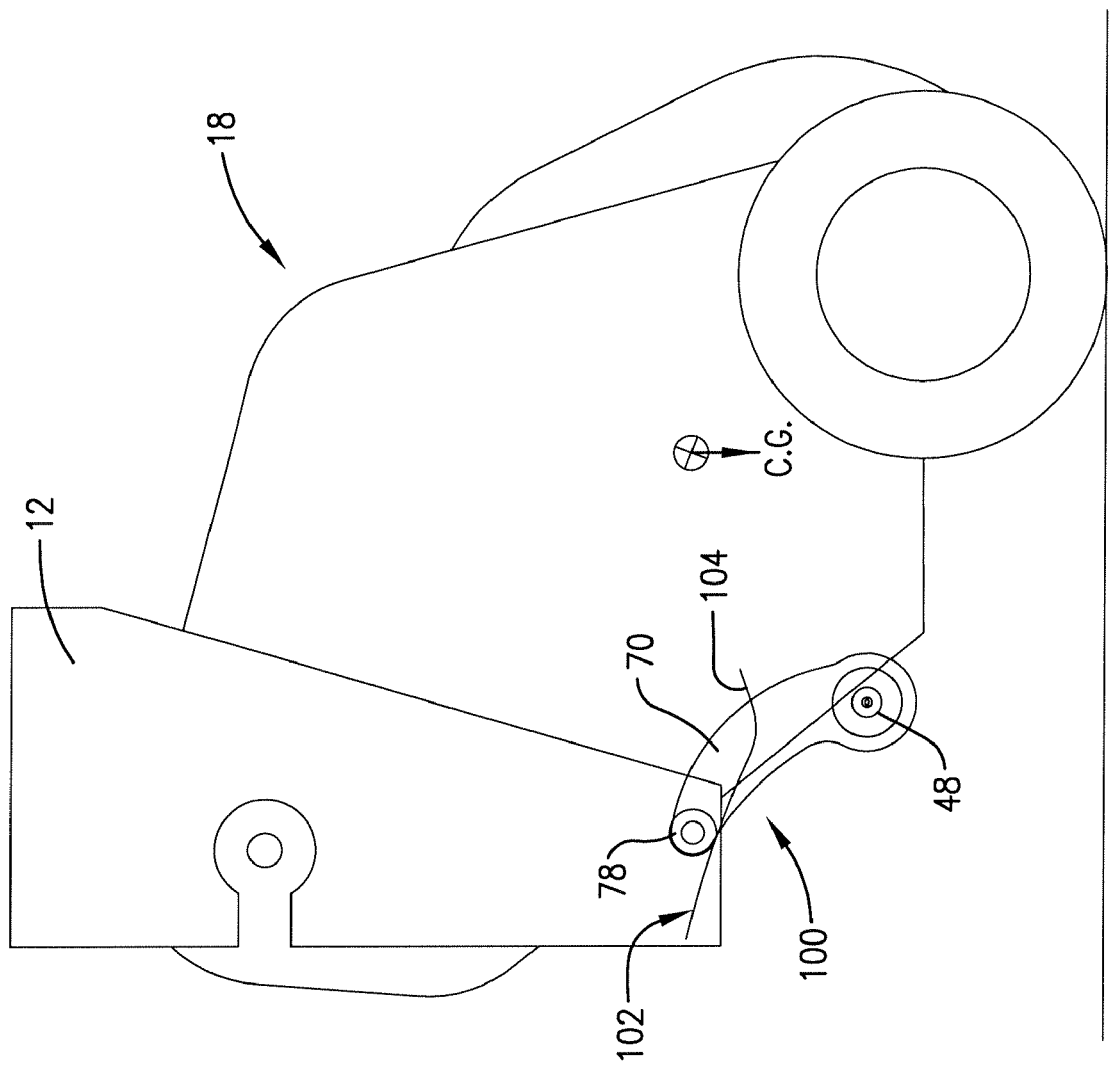
FIG. 10 is a schematic illustration of a second embodiment of the invention.

FIG. 10 shows an alternative embodiment wherein header 18 is provided with a flotation mechanism 100 that differs somewhat from flotation mechanism 46 of FIGS. 1-9. Mechanism 100 still has torsion bar 48 mounted on header 18 in the same manner as the first embodiment and is still provided with crank arm 70 at one end of torsion bar 48 and follower 78 at the radially outer end of crank arm 70. However, in this embodiment, follower 78 rides along a fixed cam track 102 that is rigidly mounted on frame 12 of the baler. As noted, cam track 102 is inclined downwardly and forwardly at an angle of approximately 30° from horizontal and has an upturned forward end 104 that engages follower 78 when header 18 is pivoted upwardly near the upper limit of its range of travel. Torsion bar 48 is wrapped and unwrapped in generally the same fashion as in the first embodiment, except that in this embodiment the benefits obtained with the swingable cam plate 72 and baler link 74 of the first embodiment are lacking.

The inventor(s) hereby state(s) his/their intent to rely on the Doctrine of Equivalents to determine and assess the reasonably fair scope of his/their invention as pertains to any apparatus not materially departing from but outside the literal scope of the invention as set out in the following claims.

The invention claimed is:

1. In a farm machine, the improvement comprising:
a header engageable with the ground during advancement of the machine and swingably attached to a frame of the machine for up and down movement relative to the frame during changes in the terrain;
a rotatable spring-force torsion bar mounted on the header for up and down movement with the header relative to the frame; and
torsion bar loading apparatus operably interconnecting the frame and the torsion bar in a manner to twist the torsion bar in response to downward movement of the header relative to the frame and thereby provide a flotation force to the header tending to lighten the weight of the entire header against the ground,
said torsion bar having one end anchored to the header against rotation relative to the header and an opposite end supported for rotation relative to the header during twisting of the torsion bar by the loading apparatus.

2. In a farm machine as claimed in claim 1,
said one end of the torsion bar being anchored to the header in such a manner that the rotative position of the one end of the torsion bar can be rotatively adjusted for adjusting the amount of pre-load flotation force on the header.

3. In a farm machine as claimed in claim 1,
said header being wider than the frame along a direction generally transverse to a direction of travel of the machine during advancement of the machine.

4. In a farm machine as claimed in claim 3,
said torsion bar being longer than the width of the frame.

5. In a farm machine as claimed in claim 1,
said farm machine comprising a baler,
said baler including a duct extending generally along a direction of travel of the baler during advancement of the machine,
said torsion bar being disposed below the duct.

6. In a farm machine as claimed in claim 5,
said torsion bar being longer than the width of the duct along a direction generally transverse to the direction of travel of the baler.

* * * * *